Patented Sept. 14, 1948

2,449,533

UNITED STATES PATENT OFFICE 2,449,533

SYNERGISTIC INSECTICIDAL COMPOSITIONS

Edward R. McGovran, Hyattsville, Md., Elmer L. Mayer, Anaheim, Calif., and Florence B. Talley, Philadelphia, Pa., assignors to the United States of America as represented by the Secretary of Agriculture No Drawing. Application July 8, 1947, Serial No. 759,683

4 Claims. (Cl. 167—34)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to insecticides and has among its objects the provision of improved insecticidal compositions.

We have found that synergistic insecticidal action results when insecticidal nicotine compounds are used in conjunction with phthalonitrile as a synergist therefor.

This invention is illustrated by the following tabulated experimental data obtained by using insecticidal compositions comprising nicotine sulfate, as an example of an insecticidal nicotine compound, and phthalonitrile as the synergist therefor, incorporated in an inert dust, as an illustrative carrier for these active ingredients. These data also include tests made by employing dust compositions containing nicotine sulfate alone and also containing phthalonitrile alone. The tests were conducted on the fourth instar larvae of the armyworm by methods similar to those described by Swingle ("Laboratory Procedures in Studies of the Chemical Control of Insects." Am. Assoc. Adv. Sci. 20, 82–84 (1943)).

The individual insecticidal effects of nicotine sulfate and of phthalonitrile, at various concentrations, are shown in Table I, following:

Table I

| Nicotine Sulfate | | Phthalonitrile | |
|---|---|---|---|
| Concentration | Average mortality | Concentration | Average mortality |
| Percent | Percent | Percent | Percent |
| 3.5 | 32 | 3.0 | 49 |
| 5.0 | 51 | 3.5 | 78 |
| 8.5 | 74 | 4.0 | 77 |
| 10.0 | 88 | 5.0 | 100 |

The results obtained using compositions containing nicotine sulfate in admixture with phthalonitrile are shown in Table II, following:

Table II

| Concentration of Active Ingredients | Average Mortality |
|---|---|
| 2% nicotine sulfate+0.15% phthalonitrile | 40 |
| 2% nicotine sulfate+0.25% phthalonitrile | 66 |
| 2% nicotine sulfate+0.35% phthalonitrile | 84 |

Synergistic insecticidal action resulting from the use of nicotine sulfate in conjunction with phthalonitrile is evidenced in avaluating the data listed in Tables I and II by the method of Wadley ("The Evidence Required to Show Synergistic Action of Insecticides and a Short Cut in Analysis." E–223, Mimeo. Pub., 1945, U. S. D. A. Bur. Ent. and Plant Quar.).

The evaluated results thus obtained, showing that the effect of the nicotine sulfate-phthalonitrile mixtures is significantly greater than the maximum effect predictable from separate actions of the two insecticidal agents, are indicated in Table III, following:

Table III

| Nicotine Sulfate Concentration | Phthalonitrile Concentration | Nicotine Equivalent [1] | Mortality | |
|---|---|---|---|---|
| | | | Actual | Interpolated |
| Percent | Percent | | Percent | Percent |
| 2.0 | 0.15 | 2.28 | 40 | 17 |
| 2.0 | 0.25 | 2.46 | 66 | 20 |
| 2.0 | 0.35 | 2.65 | 84 | 23 |

[1] Calculated on the basis of a 1.85 nicotine equivalent for phthalonitrile at the dosage giving 50 percent mortality (L. D. 50).

Analogous results showing a pronounced synergistic action were obtained when various compositions containing mixtures of insecticidal nicotine compounds with phthalonitrile were tested against the pea aphid, diamondback moth, and the green dockbeetle. The relative proportions of active ingredients may vary within wide limits. Thus, for example, the data tabulated above show results obtained using a nicotine-phtalonitrile ratio of about 10 to 1. In tests against the pea aphid, however, maximum synergistic action was observed when this ratio was about 1 to 1.

Synergistic action results when phthalonitrile is used in conjunction with nicotine compounds, such as nicotine, nicotine sulfate, nicotine bentonite, cuprous nicotine cyanide, zinc nicotine thiocyanate, cupric nicotinamino laurate, and so forth.

Insecticidal compositions containing insecticidal nitcotine compounds and phthalonitrile as the synergist can be combined with solvents, diluents and carrier media, adhesives, spreading, wetting and emulsifying agents and other similar ingredients. They may be advantageously utilized in dusts, sprays, aerosol mixtures, fumigant compositions, insecticidal coating compositions and in general applied by methods commonly used for control or eradication of insects and other pests.

The insecticidal compositions of our invention make it possible to attain the same degree of toxicity with substantially smaller amounts of active ingredients than that required, under similar conditions, when analogous compositions are used which do not contain phthalonitrile as a synergist.

Having thus described our invention, we claim:

1. An insecticidal composition comprising an insecticidal nicotine compound and phthalonitrile as a synergist therefor.

2. An insecticidal composition comprising nicotine sulfate and phthalonitrile as a synergist therefor.

3. An insecticidal composition comprising nicotine and phthalonitrile as a synergist therefor.

4. An insecticidal composition comprising an insecticidal nicotine compound and phthalonitrile as a synergist therefor, incorporated in a carrier.

EDWARD R. McGOVRAN.
ELMER L. MAYER.
FLORENCE B. TALLEY.

REFERENCES CITED

The following references are of record in the file of this patent:

UNITED STATES PATENTS

| Number | Name | Date |
|---|---|---|
| 1,546,240 | Jonson | July 14, 1925 |
| 2,200,564 | Schechter | May 14, 1940 |
| 2,345,895 | Sullivan | Apr. 4, 1944 |